*INVENTOR.*
RAYMOND A. BARBEAU
DONALD K. CLOSE
*BY* Marshall M. Truex
ATTORNEY

Sept. 27, 1960 R. A. BARBEAU ET AL 2,954,435

CONTROLLED END OF RECORD DEVICE

Filed Jan. 22, 1957 4 Sheets-Sheet 2

Sept. 27, 1960 R. A. BARBEAU ET AL 2,954,435

CONTROLLED END OF RECORD DEVICE

Filed Jan. 22, 1957 4 Sheets-Sheet 3

2,954,435
Patented Sept. 27, 1960

2,954,435

CONTROLLED END OF RECORD DEVICE

Raymond A. Barbeau, Poughkeepsie, and Donald K. Close, Wappingers Falls, N.Y., assignors to International Business Machines Corporation, New York, N.Y., a corporation of New York Filed Jan. 22, 1957, Ser. No. 635,337

7 Claims. (Cl. 178—69)

This invention relates to tape sensing and recording devices and more particularly to means for ascertaining the end of a record by sensing indicia associated therewith in the form of codes groups on such a record.

In the utilization of data recorded on a tape, it becomes necessary to ascertain when one unit amount of record has ended. In the use of paper tapes, data is recorded by perforating the tape column by column with code designations indicative in each instance of a character or a machine function. Unit records are composed of groups of such recorded data with predetermined codes in the tape signifying the beginning and end of a unit record. Upon sensing such recordings, a series of output pulses are obtained from the sensing unit comprising pulses corresponding to the beginning-of-unit-record data, and end-of-unit-record code designations.

Heretofore, it has been possible to fail to identify the end of a unit record without immediate notice through failures to sense the tape properly. Also, errors made while recording end-of-unit-record codes have remained undetected upon sensing the record, and accordingly, the data has not been properly processed. In a particular instance, when tape is being processed in accordance with the operation of a device provided in the copending application "Checking System for Record Data Transmission," Serial No. 553,001, filed December 12, 1955, it is necessary that an end-of-unit-record be recognized in order that a bit check may be made to verify the unit record. Many other situations arise where it is not only desirable to detect the end-of-unit-record, but imperative to do so, as in employing the tape as a source of values for a computer. Thus, end-of-unit-record groups must be recognized to initiate machine functions or to stop the tape to prevent the combination of two unit records.

Briefly stated, the novel device of the present invention is arranged to accept the end-of-unit-record codes in column by column sequence, to remember each for succeeding columns, and then to analyze the codes to cause normal machine functions if all of the end-of-unit-record codes are detected in the proper order, and to cause an error indication if one of the codes is not detected or one code is misplaced with respect to the other codes.

In some tape processing machines, it is conventional to complete each unit record with a "Carriage Return" (CR) code, a "Figures Shift" (FS) code, and a "Line Feed" (LF) code. These codes are not arbitrary in this instance because if the tape is used in a telegraph printer, it is necessary to have at least a Carriage Return and Line Feed code designation to cause the printer carriage to return to the left-hand margin of the paper and execute a line feed. Accordingly, in this illustration of the principles of the invention, an end-of-unit-record (EOUR) code group comprising CR, FS and LF codes is used although other code configurations and orders are feasible and may be used in a similar manner. When these codes are used in this sequence, an end-of-unit-record code group is distinctive since CR, FS do not appear in this combination in any other portion of the unit record. Likewise, CR, another tape code, LF do not occur in this combination except at the end of a unit record. CR should never appear during the intelligence portion of the record since it is conventional to record each line of a message as a unit record.

It is an object of this invention to provide an improved device for recognizing the end of a unit record.

It is another object of this invention to provide an improved device for analyzing an end-of-unit-record code group and for initiating normal machine functions if all are detected in the prescribed order.

It is another object of this invention to provide an improved device for analyzing end-of-unit-record code designations and for controlling tape feeding and sensing if an error is detected.

It is another object of this invention to provide a device to determine if the end-of-unit-record codes are received in the correct sequence.

It is an object of this invention to provide a device wherein a carriage return code sensed in any place except in the end-of-unit-record code group gives a non-check indication.

It is a still further object of this invention to provide an improved device in which a first predetermined code conditions circuits to receive indications of a second predetermined code; a second predetermined code, if received, conditions circuits to receive indications of the third predetermined code; the third predetermined code, if received, conditions circuits to initiate normal functions. Alternately, if either the second or third predetermined code or both are not received in sequence, an error indication is given.

It is a still further object of this invention to provide an improved recognition device for an end-of-unit-record code group, comprising carriage return, figures shift, and line feed codes in which figures shift or line feed codes may be sensed in the intelligence portion of the record without an error indication being given.

Other objects of the invention will be pointed out in the following description and claims and illustrated in the accompanying drawings which disclose, by way of example, the principles of the invention and the best mode, which has been contemplated, of applying that principle.

In the drawings:

Fig. 1 is a functional block diagram illustrating the principles of this invention.

Fig. 2 is a diagram showing the manner in which

Figure 3:
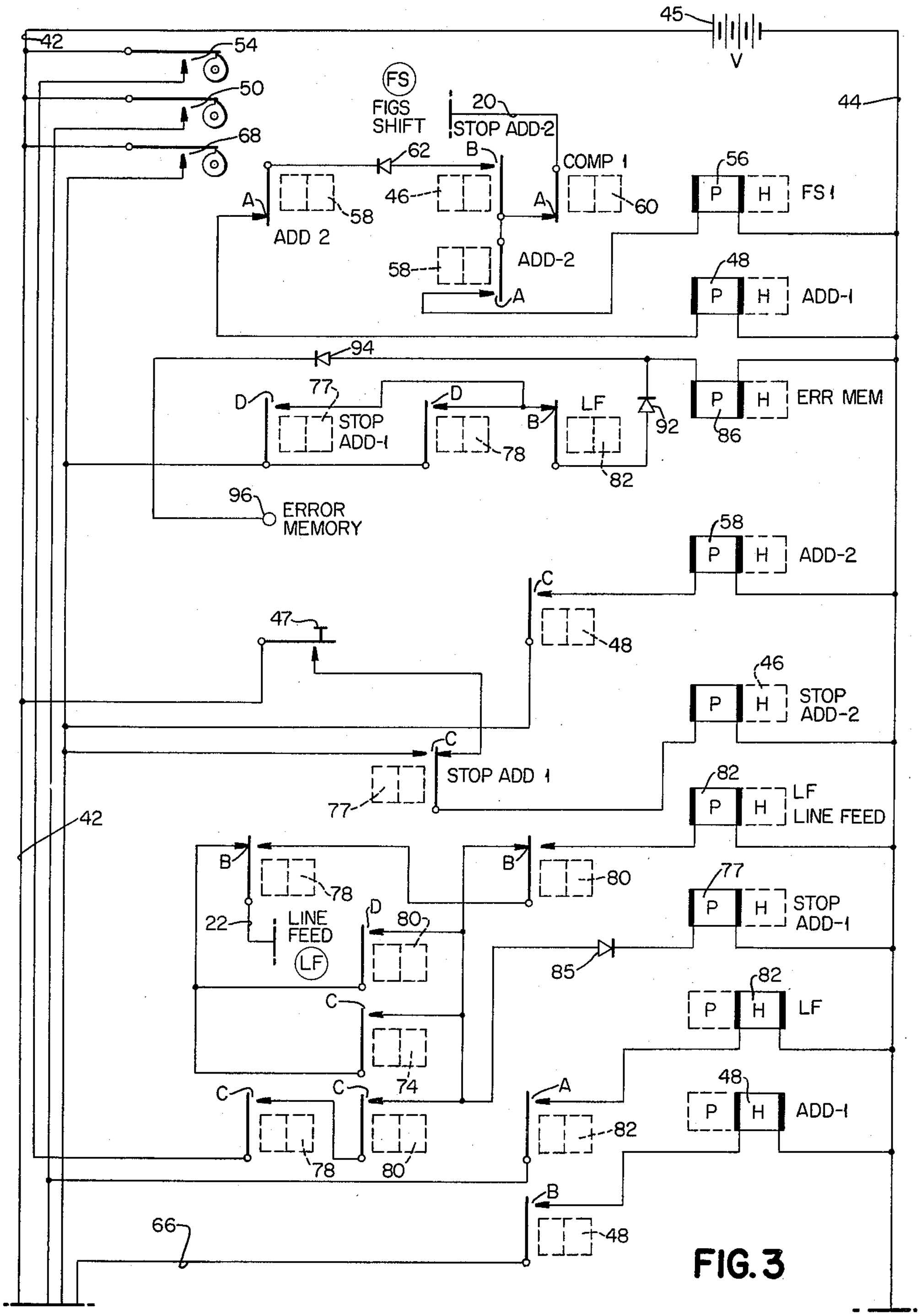
Figs. 3 and 4 are assembled.
Figure 4:
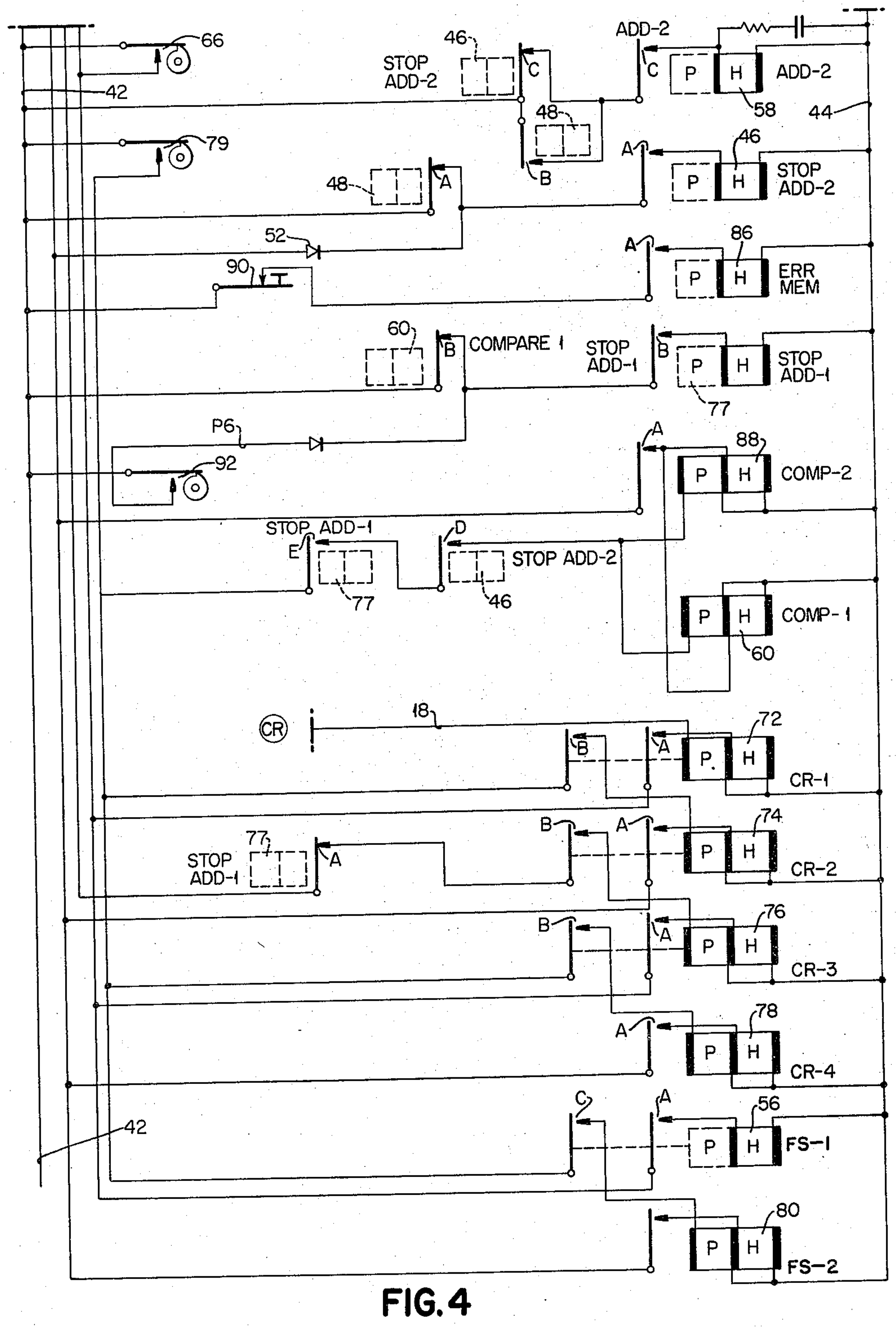

Figs. 3 and 4 constitute a general wiring diagram of the novel device.

Figure 5:
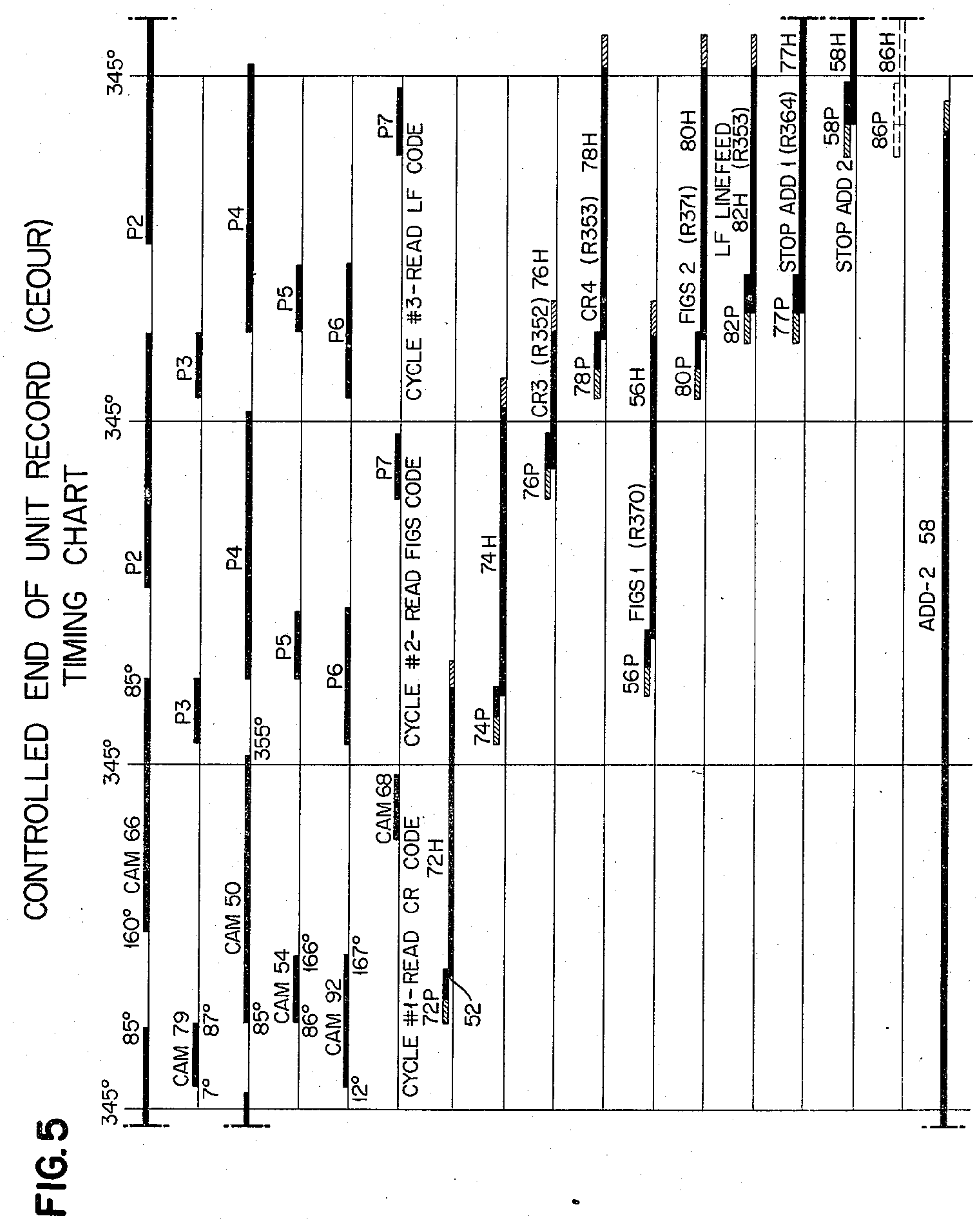

Fig. 5 is a timing chart for an end-of-unit-record code group in tape sensing cycles.

Figures 1, 2:
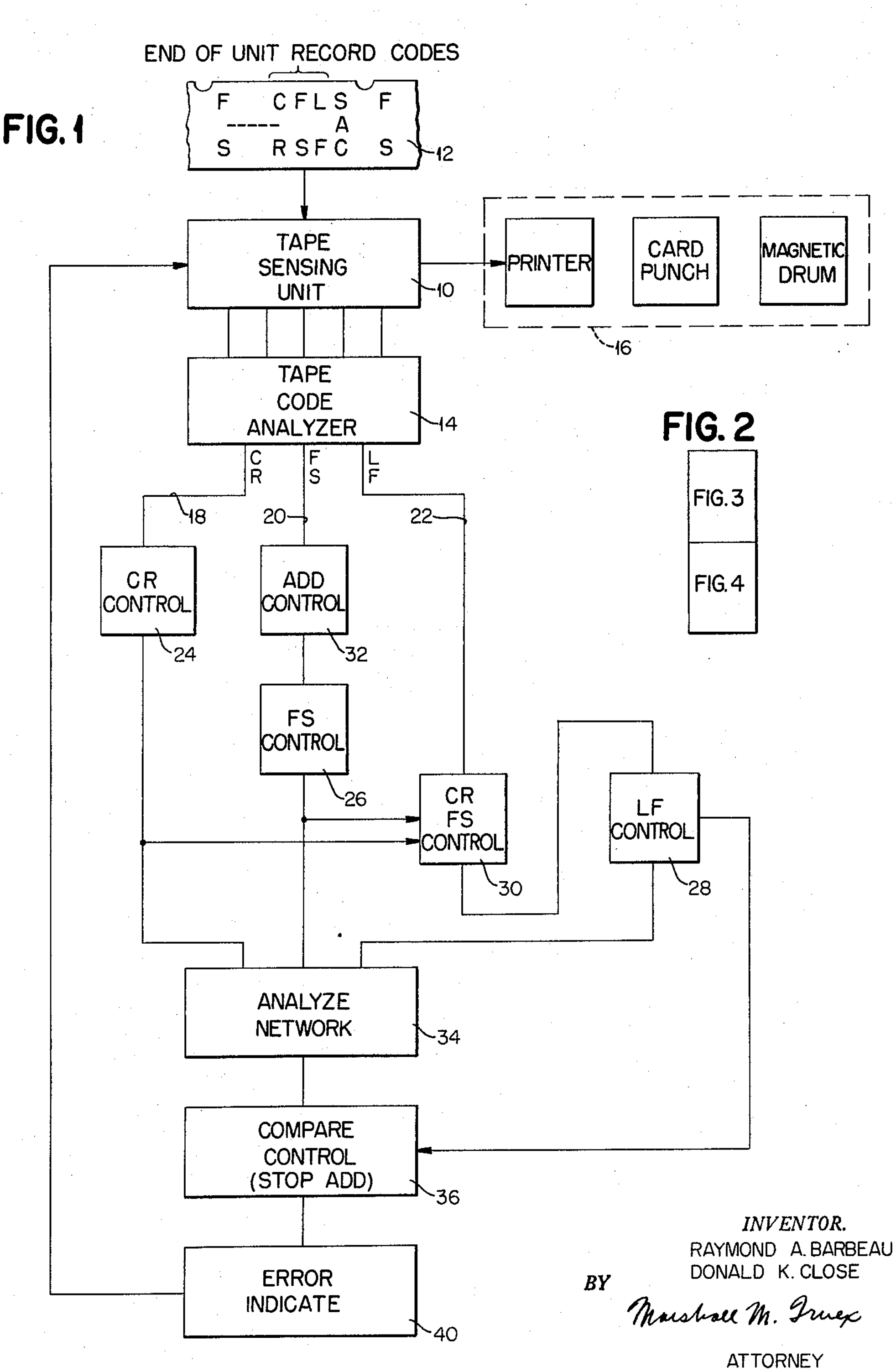

With reference to Fig. 1, a tape reader or sensing unit 10 is shown which may be of the type described in U.S. Patent 2,637,399, Doty. The tape reader is adapted to feed a tape 12, column by column while reading the code designations perforated in the tape. The tape reader has a cam shaft (55 in Fig. 5 of the Doty patent) which rotates continuously while the tape reader is operated, and on this shaft are mounted various cams which control the feeding and sensing of the tape as well as other machine functions to be described hereafter. Each rotation of the shaft is taken to be a machine cycle of 360° with the start and end of a cycle designated as 345°.

In Fig. 1, the illustrated tape 12 employs a five-unit telegraphic code familiar to those skilled in the art. A code designation is assigned to each of the letters of the alphabet and additional code designations are assigned to machine functions as described in detail in Patent No.

2,637,399, Doty. While the codes are actually perforated holes, the machine functions are shown for clarity. As the tape 12 is advanced, data is sensed column by column and transferred sequentially to a tape code analyzer 14 and other devices 16, for example the card punch of the Doty patent, a page printer or magnetic drum. The code analyzer 14 has three output circuits, each associated with one of the end-of-unit-record (EOUR) codes. When one of these codes CR (Carriage Return), FS (Figures Shift), or LF (Line Feed), is fed into the analyzer, a signal is provided at the output associated with the particular code applied. When a CR code is fed to the analyzer unit, a signal is provided on line 18. Similarly, when a FS code is fed to the analyzer unit, a signal is provided on line 20, and when a LF code is fed to the analyzer unit, a signal is provided on line 22. An example of one type of such a tape code analyzer is shown in Fig. 26 of Patent No. 2,637,399, Doty.

In effect, CR control 24 and FS control 26, store the fact that a respective one of the codes has been sensed and conditions circuits in a manner to be described in detail hereafter. A line feed control unit 28 is energized only when CR and FS codes are properly received to condition a CR—FS control unit 30 and when a LF code is received on the next succeeding cycle after a FS code.

An add control 32 provides control over FS impulses when the intelligence portion of the unit record is being sensed since FS codes occur within the record to signify that upper case characters follow. Accordingly, all FS codes are ignored by this device except when they occur in combinations with CR and LF codes.

An analyzing unit 34 and the CR—FS control 30 actuate a compare control circuit 36 if the following conditions are present:

(1) CR, FS, LF
(2) CR, other code, LF
(3) FS, LF
(4) CR, FS, other code
(5) CR, LF A CR code, if not followed in the next two succeeding cycles by FS and LF, provides an error indication.

In the first condition, continued tape processing is permitted. In all of the other conditions, an error indicate unit 40 is actuated to stop tape feeding and permit correction of the error condition or otherwise control machine functions if desired. Therefore, if only two of the three end-of-unit-record codes are received in the correct sequence, of if CR is received in any place except at the end of the unit record, an error is automatically signified.

Referring now to the circuits in Figs. 3 and 4, there is shown a line 42 and a line 44 which are connected to the positive and negative sides, respectively, of a D.C. voltage source 45. For simplicity of explanation, the terms positive and negative side of the line will be used hereafter.

The tape sensing unit is at the beginning of a unit record and is in a non-add condition due to energization of relay 46 caused by a brief closing of a switch 47. The hold coil of a Stop Add 2 relay 46 is held through its own normally open, now closed, A points and through normally closed A points of an Add–1 relay 48 (Fig. 4). A cam contact 50 and a rectifier 52 are connected in parallel with the A points of Add–1 relay 48. With this connection, the hold coil of relay 46 remains energized until the point A of relay 48 opens and until cam contact 50 breaks the first time thereafter.

In the first cycle of tape reading at the beginning of a unit record, a FS code is read for the duration of a cam 54 make time at the sensing unit 10 in Fig. 1. This code is fed to the tape code analyzer 14 which causes a signal to be available on line 20. In Fig. 3, the pick coil of a FS–1 relay 56 is not energized since the A points of an Add–2 relay 58 are open although the A points of a Compare–1 relay 60 are closed at this time. However, the pick coil of the Add–1 relay 48 is energized from line 20 through the A points of an Add–2 relay 58, through a rectifier 62, and through the B points of the Stop Add–2 relay 46. A hold circuit is established for the Add–1 relay 48 through its own B points and a cam 66, which holds through the early portion of the next cycle. This in effect signifies a beginning of a unit record.

When Add–1 relay 48 is energized, the hold circuit for the Stop Add–2 relay 46 (established through the A points of the Add–1 relay 48 directly to the positive side of the line) is broken. However, the Stop Add–2 hold coil remains energized through cam 50 until 355°. At 237° of the first record cycle, the Add–2 relay 58 is energized through the C points of Add–1 relay 48 and a cam contact 68 from 231° to 331°. Its hold circuit in Fig. 4 is established through its own C points, the normally open B points of Add–1 relay 48 to the positive side of the line. When the Add–2 relay 58 hold circuit is first established the C points of the Stop Add–2 relay 46 are open. However, when the B points of the Add–1 relay open at 85° under control of contacts of cam 66, the C points of the Stop Add–2 relay have closed at 355°, so that the hold of Add–2 relay remains effective until the C points of the Stop Add–2 relay 46 are opened. In this manner, the machine is placed in an add condition for verifying the accuracy of recorded data as explained in copending application, Serial No. 553,001, which was referred to previously. Further, the add condition causes FS to be distinguished in the data and EOUR portions of the record as against the FS code at the beginning-of-unit-record portion.

With the circuits so conditioned, it will be appreciated that an FS code on succeeding data cycles is effective to energize the pick coil of the FS–1 relay 56, but the Add–1 relay 48 is prevented from being actuated since the B points of Stop Add relay 46 and the A points of Add–2 relay 58 are now open. Although recorded in relay storage, FS codes are ignored in this device during data reading time.

It is now assumed that data is read cycle by cycle until the first cycle of the EOUR code group, when a CR code is sensed. At cam 54 make time, a signal is provided on the line 18 resulting from the sensing of a CR code. In Fig. 4, this CR pulse energizes the pick coil of a CR–1 relay 72 through cam 54 until 166°. A hold circuit is established for the hold coil of relay 72 through its own A points and contacts of the cam 66 to the positive side of the line until 85° of the next cycle.

During the second EOUR cycle, the one in which a FS code is read, a CR–2 relay 74 is energized through the contacts of the cam 79 at 7° and the B points of CR–1 relay 72. Its hold circuit is completed through its own A points and by contacts of the cam 50 and held until 355° of the next cycle. Energization of the CR–2 relay 74 signifies that a CR code was sensed on the preceding cycle. At cam 54 make time, a signal is provided on line 20 indicative of a FS code read, and, in this instance, the pick coil of FS–1 relay 56 (Fig. 3) is energized through the A points of the relay 60 and the A points of the Add–2 relay 58. The Add–1 relay is not energized at this time since the B points of the Stop Add–2 relay 46 are open. In Fig. 4, at cam 66 make time, the hold coil of FS–1 relay 56 is energized through contacts of the cam 66 and its own A points. Further, during this FS cycle the pick coil of CR–3 relay 76 is energized through contacts of cam 68, the A contact of a Stop Add–1 relay 77, and the B points of the CR–2 relay 74. The hold coil of relay 76 is energized through its A points and contacts of the cam 66.

In the third EOUR cycle, the one in which a LF code is read, the pick coil of a CR–4 relay 78 (Fig. 4) is energized through the B points of the CR–3 relay 76 and contacts of a cam 79. Its hold circuit is established through its own A points and the contacts of the cam 50. The pick coil of a FS–2 relay 80 is energized through the C points of FS–1 relay 56 and contacts of the cam 79.

Its hold circuit is established through its own A points and the contacts of the cam 50. A LF code is sensed and the code analyzer 14 provides a signal on line 22 shown in Fig. 3. The pick coil of a LF relay 82 is energized through the transfer B points of the CR–4 relay 78 and the transfer B points of the FS–2 relay 80. The hold coil of the LF relay 82 is energized through its own A points and the contacts of the cam 50. The pick coil of the Stop Add–1 relay 77 is energized through the rectifier 85, the C points of the FS–2 relay 80, the C points of the CR–4 relay 78, and the contacts of the cam 54. The hold of relay 77 is provided in Fig. 4 through its own B points, the B points of the Compare–1 relay 60 to the positive side of the line. At 237° the contacts of the cam 68 make and energize the pick coil of the Stop Add–2 relay 46 (Fig. 3) through the transfer C points of the Stop Add–1 relay 77. The hold circuit of relay 46 is established in the manner described previously and remains complete until the Add–1 relay 48 is actuated followed by the opening of the contacts of the cam 50. The energization of the Stop Add–2 relay 46 de-energizes the Add–2 relay 58 with the opening of the C points of relay 46.

In Fig. 3, the contacts of the cam 68 close at 237° of the LF cycle to verify the EOUR code group by attempting the energization of an error memory relay 86. In this example of the operation of the device wherein all EOUR codes have been received properly, the D points of the Stop Add–1 relay 77 are closed, and the D points of CR–4 relay 78 are closed in parallel with the first-mentioned relay points. However, the B points of the LF relay 82 are open, and the error memory relay cannot be energized. Since the energization of the LF relay 82 depends first upon the sensing of a CR code in that order, the fact that a parallel circuit exists in this instance around the D points of the CR–4 relay 78 does not distract from the EOUR check. It will become apparent hereafter that the D points of relay 78 are connected to provide an error condition when a CR code is received without being followed by Figures Shift, Line Feed codes.

The cycle following the EOUR code group is a comparing cycle for the purpose of tape accuracy checking as taught in the copending application, Serial No. 553,001, referred to previously. It suffices to say that the relay 60 and another relay 88 are energized through the contacts of the cam 79, the E points of the relay 77, and the D points of the relay 46. A hold circuit is provided through the A points of the relay 88 and contacts of the cam 50. An end of message code or a beginning-of-unit-record code (FS) is sensed following a compare cycle and machine operations proceed accordingly.

The case wherein an EOUR code group of CR, FS and LF is properly received has been explained. In the case where CR, another code (not FS), and LF are sensed, it is evident from Fig. 1 that CR control 24 is operated but the absence of the FS code prevents operation of the FS control 26, and, in turn, the operation of the CR and FS control 30. Accordingly, a LF signal, though available on line 22, is prevented from operating LF control 28. More specifically, in the circuits of Fig. 3, the LF relay 82 cannot be energized since under these conditions the B points of the CR–4 relay 78 are transferred and the B points of the FS–2 relay 80 are normal. However, an alternate path is available through the rectifier 85 to energize the Stop Add–1 relay 77. Stop Add–2 relay 46 is energized in the manner previously described to de-energize the Add–2 relay 58. Thereafter, the pick coil of the error memory relay 86 is energized through the contacts of the cam 68, the D points of the relay 77 and D points of relay 78, the B points of the LF relay 82, and the rectifier 92. A hold circuit for relay 86 is available through its own A points, through a reset switch 90 to the positive side of the line.

Points (not shown) of the error memory relay 86 may be used to stop the tape sensing unit 10 and decouple the data-accepting devices 16 or perform other functions if desired.

In the case wherein a FS code is read followed by a LF code, a FS code causes operation of FS control 26 since circuits are in an addition condition. However, CR and FS control prevents a LF pulse from operating LF control 28 and instead causes a Stop Add control. Specifically, in Fig. 3, a LF signal on line 22 passes through the normally closed B points of the CR–4 relay 78, the D points of the Fig. 2 relay 80, the rectifier 85, and the pick coil of the Stop Add–1 relay 77. The error memory relay 86 is now energized through the contacts of the cam 68, the D points of the Stop Add–1 relay 77, the B points of the LF relay 82, and the rectifier 92.

In the case wherein CR, FS and another code (not LF) are read, the operation corresponds to the first two cycles of Fig. 4. During the third cycle (normally LF code), there is no signal provided to the line 22. However, the Stop Add–1 relay 77 is energized from contacts of the cam 54, through the C points of the CR–4 relay 78, through the C points of the FS–2 relay 80, and through the rectifier 85. The impulse from the cam 54 has no path to the LF relay 82. The Error Memory relay 86 is energized through the D points of the Stop Add–1 relay 77, the D points of the CR–4 relay 78 in parallel with the latter, the B points of the LF relay 82, and the rectifier 92.

In the case wherein the code group comprises a CR code followed only by a LF code, the CR control 24 is energized and the CR–FS control 30 and LF control 28 pass a signal to the Stop Add control 36. In Fig. 3, a LF signal on the line 22 passes through the normal B points of the CR–4 relay 78, the C points of the CR–2 relay 74, and through the rectifier 85 to the pick coil of the Stop Add–1 relay 77. There is no path to the LF relay 82. In Fig. 4, the A points of Stop Add–1 relay 77 prevent the pick of the CR3 relay 76 to prevent further CR storage. The Error Memory relay 86 is actuated by means of the cam 68, the D points of the Stop Add–1 relay 77, the B points of the LF relay 82, and the rectifier 92.

Where a CR code is received individually, the absence of the FS code is detected by the failure to operate FS control 26, CR and FS control 30, and LF control 28. In Fig. 3, the Error Memory relay 86 is energized from the cam 68, through the D points of the CR–4 relay 78, the B points of the LF relay 82, and the rectifier 92.

When the Error Memory relay 86 is energized, a signal is available through a diode 94 at an Error Memory hub 96. This hub may be used to control functions in the manner described in the Doty patent referred to previously.

While code designations recorded as perforations in a paper tape have been used to illustrate the principles of this invention, it will be understood that the device is applicable to other serially recorded indicia, and it is not intended that the invention be limited to paper tape. Furthermore, it is obvious that the principles of this invention may be applied by those skilled in the art to tape preparation devices for ascertaining that an end of record code group has in fact been recorded in the tape. For example, this device is applicable as an additional checking device to the system shown in copending application P.O. Serial No. 553,001, which has been referred to previously.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention therefore, to be limited only as indicated by the scope of the following claims.

What is claimed is:

1. In a machine for sensing indicia in seriatim from a tape, said tape having a plurality of indicia in series comprising a record, said tape containing a plurality of records, the end of each record on the tape being indicated by a predetermined permutation of a plurality of end of record indicia spaced longitudinally along the tape; means for serially sensing indicia from said tape, an error indicating device, control means for said error indicating device including means responsive to said sensing means only when said end of record indicia are sensed for recording the presence of said end of record indicia, means responsive to said recording means for detecting the order in which said end of record indicia are sensed, and means for energizing said error indicating device when said end of record indicia are sensed in an incorrect order.

2. In a machine for sensing indicia in seriatim from a tape, said tape having a plurality of indicia in series comprising a record, said tape containing a plurality of records, each of said records ending in at least two indicia in predetermined sequence distinctive as an end of record notation, a device for ascertaining that a record has ended, comprising means for serially sensing said indicia from said tape, discriminating means responsive to said sensing means for generating signals indicative of individual end of record indicia, first cyclic storage means coupled to said discriminating means for receiving an initial signal therefrom, second cyclic storage means coupled to said discriminating means for receiving a first succeeding signal from said discriminating means, detecting mean coupled to said discriminating means for receiving a second succeeding signal therefrom when said first and second cyclic storage means have received said initial signal and said first succeeding signal and validity check means effective to indicate a defect in said end of record notation.

3. In a machine for sensing indicia in seriatim from a tape, said tape having a plurality of indicia in series comprising a record, said tape containing a plurality of records, each of said records ending in a series group of indicia distinctive as an end of record tag, a device for ascertaining that a record has ended, comprising, means for serially sensing said indicia from said tape, discriminating means providing individual signals for each of said end of record indicia when sensed, means coupling said sensing means to said discriminating means, first control means coupled to said discriminating means responsive to a signal associated with said first of said end of record indicia, second control means coupled to said discriminating means responsive to a signal associated with a second of said end of record indicia, third control means coupled to said discriminating means responsive to a signal associated with a third of said end of record indicia when conditioned by said first and second control means, analyzing means coupled to said discriminating means conditioned by said signals effective to indicate receipt of a complete end of record tag and effective to provide an error indication when an incomplete end of record tag is detected.

4. In a device for reading a tape bearing data represented by code groups of indicia, the groups being spaced along the tape and being arranged in records, each record comprising a plurality of code groups, the end of each record on the tape being indicated by a special permutation of a plurality of code groups of indicia spaced longitudinally along the tape; means for sensing said code groups of indicia in succession, means for decoding end of record code groups of indicia and generating a specifically different signal for each end of record code group, an error indicating device, control means for said error indicating device including means for receiving the signals generated for the end of record code groups of indicia by said generating means, said control means including also means to detect the order in which said last mentioned signals are received by said control means, and means for energizing said error indicating device when said last mentioned signals are received by said control means in an incorrect permutation.

5. In a machine for sensing indicia serially from a tape, said tape having a plurality of indicia in series comprising a record, said tape containing a plurality of records, each record ending in a series group of indicia in predetermined sequence distinctive as an end of record tag, said tag having an initial code and two succeeding codes, a device for indicating the state of said tag, comprising, means for serially sensing said indicia from said tape, discriminating means providing individual signals for each of said end of record codes when sensed, means coupling said sensing means to said discriminating means, first storage means coupled to said discriminating means responsive to said initial end of record signal to provide an output signal, second storage means coupled to said discriminating means responsive to the first succeeding code in said end of record group to provide an output signal, a first normally open switch operable to close in response to said initial signal, a normally closed switch in series connection with said first switch, third storage means coupled to said discriminating means responsive to a last succeeding code in said end of record group when said first and second storage means are operated to provide an output signal, said third storage means operable to open said normally closed switch, and a control device associated with said switches for giving an error indication when said switches are closed.

6. A device in accordance with claim 5 wherein a second normally open switch is provided in parallel connection with said first normally open switch, and additional means are provided which are operable by said second storage means and said second succeeding end of record signal to close said second normally open switch when no output signal is provided by said first storage means.

7. A device in accordance with claim 6 wherein said additional means is effective to operate in response to output signals from said first and second storage means in the absence of said output signal from said third storage means.

References Cited in the file of this patent

UNITED STATES PATENTS

| | | |
|---|---|---|
| 2,518,405 | Van Duuren | Aug. 8, 1950 |
| 2,702,380 | Brustman et al. | Feb. 15, 1955 |